United States Patent
Kim et al.

(10) Patent No.: US 7,362,978 B2
(45) Date of Patent: Apr. 22, 2008

(54) DUOBINARY OPTICAL TRANSMISSION APPARATUS

(75) Inventors: Sung-Kee Kim, Seoul (KR); Han-Lim Lee, Seoul (KR); Yun-Je Oh, Yongin-shi (KR); Seong-Taek Hwang, Pyongtaek-shi (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 547 days.

(21) Appl. No.: 10/458,150

(22) Filed: Jun. 10, 2003

(65) Prior Publication Data

US 2004/0101315 A1    May 27, 2004

(30) Foreign Application Priority Data

Nov. 25, 2002   (KR) ..................... 10-2002-0073407

(51) Int. Cl.
  *H04B 10/04* (2006.01)
  *H04B 10/12* (2006.01)
(52) U.S. Cl. ....................... 398/185; 398/186
(58) Field of Classification Search ................ 398/185, 398/186
  See application file for complete search history.

(56) References Cited

U.S. PATENT DOCUMENTS 5,892,858 A *  4/1999  Vaziri et al. .................... 385/2
6,226,114 B1 *  5/2001  Ashkeboussi et al. ...... 398/192

FOREIGN PATENT DOCUMENTS

DE    10040471 A1    3/2002
EP    0825733 A      2/1998
JP    11-512277      10/1999

OTHER PUBLICATIONS

Kaiser, W. et al.; "Reduced Complexity Optical Duobinary 10-Gb/s transmitter Setup Resulting in an Increased Transmission Distance;" IEEE Photonics Technology vol. 13, No. 8; Aug. 2001; XP001107473.

* cited by examiner

*Primary Examiner*—Jason Chan
*Assistant Examiner*—Nathan Curs
(74) *Attorney, Agent, or Firm*—Cha & Reiter, LLC

(57) ABSTRACT

Disclosed is a duobinary optical transmission apparatus. The duobinary optical transmission apparatus uses the crossed phase characteristics of a duobinary signal without using a feedback-type precoder and an electric LPF, and is thereby not affected by Pseudo-Random Bit Sequence (PRBS), and is very resistant to wavelength division characteristics. In addition to a drive amplifier, a Mach-Zehnder-interferometer-type optical intensity modulator (MZ MOD), and a laser source for generating a carrier wave, the duobinary optical transmission apparatus further includes a toggle flip-flop (T.FF) and an AND gate to separate a group of '1' from input data signal in such a way that the input data signal is modulated to make each signal have a different phase.

14 Claims, 8 Drawing Sheets

| in1 | in2 | Out |
|---|---|---|
| 0 | 0 | iR → 0 |
| 0 | 1 | 0 → −1 |
| 1 | 1 | 2iR → +1 |

DUOBINARY OPTICAL TRANSMISSION APPARATUS

CLAIM OF PRIORITY

This application claims priority to an application entitled "DUOBINARY OPTICAL TRANSMISSION APPARATUS," filed in the Korean Intellectual Property Office on Nov. 25, 2002 and assigned Serial No. 2002-73407, the contents of which are hereby incorporated by reference.

BACKGROUND OF THE INVENTION

1. Field of the Invention

The present invention relates to a duobinary optical transmission apparatus.

2. Description of the Related Art

Typically, a Dense Wavelength Division Multiplexing (DWDM) optical transmission system transmits an optical signal using a single optical fiber in such a way that it enhances transmission efficiency. The optical signal is comprised of a plurality of channels having different wavelengths. In addition, the DWDM optical transmission system has been widely used for a super high-speed Internet network, which has rapidly increasing data transfer quantity, because it transmits optical signals irrespective of a transfer rate. Such a newly developed system accommodates rapidly increasing data traffics as well as transfer requests for high-speed data of more than 40 Gbps.

However, a conventional optical intensity modulation method using a Non-Return to Zero (NRZ) method has a number of limitations. For example, one limitation occurs in increasing the transfer quantity because an abrupt interference and distortion between channels occurs in a prescribed zone less than a channel interval of 50 GHz. Further, DC frequency components of a conventional binary NRZ transmission signal and high-frequency components spreading in a modulation procedure cause nonlinear characteristics and dispersion while they are propagated in an optical fiber medium. Consequently, the transmission distance at a high-speed transfer rate over 10 Gbps is limited.

In recent times, an optical duobinary technique has been intensively researched as a new optical transmission technique for obviating the transmission distance limitation caused by chromatic dispersion. The optical duobinary technique has an advantage in that it reduces the width of the transmission spectrum much more than a general binary transmission method. The transmission distance in a dispersion limitation system is inversely proportional to the square of the transmission spectrum bandwidth. For example, when the transmission spectrum bandwidth is reduced by half, the transmission distance increases by four times.

Also, the carrier wave frequency is suppressed in a duobinary transmission spectrum such that limitations in output optical power caused by the Brillouin Scattering stimulated in an optical fiber are reduced.

FIG. 1 is an exemplary a block diagram of a conventional duobinary optical transmission system.

Referring to FIG. 1, a conventional duobinary optical transmission system includes a precoder 10 for encoding a two-level data signal to a digital signal, Low Pass Filters (LPFs) 20 and 21, drive amplifiers 30 and 31, and a Mach-Zehnder-interferometer-type optical intensity modulator (MZ MOD) 40, and a laser source 50 for generating a carrier wave. The two-level data signal transmitted from the duobinary optical transmission system is applied to a differential precoder 10, and then encoded in the differential precoder 10. The encoded two-level data signal from the precoder 10 is applied to the LPFs 20 and 21, and the LPFs 20 and 21 each convert it into a three-level signal. The three-level signals of the LPFs 20 and 21 are amplified by the drive amplifiers 30 and 31, respectively. The amplified three-level signals function as the driving signal of the MZ MOD 40. The carrier wave generated from the laser source 50 modulates its own optical intensity according to the driving signal of the MZ MOD 40, and is thereby generated as an optical duobinary signal.

FIG. 2 is a block diagram of a precoder 10 of the conventional duobinary optical transmission system shown in FIG. 1.

The conventional precoder includes an XOR gate 11, and a 1-bit delay 12 for delaying an output signal of the XOR gate 11 by just one data bit and feeding back the time-delayed output signal to the XOR gate 11.

However, the aforementioned conventional duobinary optical transmission system has a disadvantage in that the XOR gate, when using a high-speed data signal, unavoidably generates an undesired time delay over at least one data bit. This, in turn causes difficulties in manufacturing such a precoder. Also, the conventional duobinary optical transmission system is affected by Pseudo Random Bit Sequence (PRBS) in producing the three-level data signal using electric LPFs. Thus, generating serious degradation in signal transmission characteristics as a length of the PRBS gradually increases, and thereby causing difficulties in the system implementation process.

SUMMARY OF THE INVENTION

The present invention reduces or overcomes many of the above limitations by providing a duobinary optical transmission apparatus which is not affected by a PRBS. In addition, the present invention provides a duobinary optical transmission apparatus that does not use a feedback-type precoder and electric LPFs, and is also very resistant to wavelength division characteristics.

In accordance with one illustrative embodiment of the present invention, a duobinary optical transmission apparatus is provided having an optical modulator. The optical modulator generates a modulated optical signal made by a modulation of an optical carrier wave. The optical modulator includes a T flip-flop, an AND gate, a delay, an attenuator, a power combiner, a modulator driving signal generator and a light source The T flip-flop receives a two-level data signal, and generates a toggled output signal at every rising edge of the two-level data signal. The AND gate receives the two-level data signal and the output signal of the T flip-flop, and performs an AND operation on the received signals. The delay receives an inverted signal of the two-level data signal, and delays the inverted two-level data signal by a predetermined time. The attenuator reduces the intensity of the output signal of the delay by half. The power combiner receives the output signal of the AND gate and an output signal of the attenuator, and generates a three-level signal by adding them. The modulator driving signal generator generates a modulator driving signal upon receiving the three-level signal. The light source generates an optical carrier wave. The interferometer-type optical modulator modulates the carrier wave into a two-level optical signal according to the modulator driving signal.

Preferably, the T flip-flop and the AND gate may separate an odd-th (or even-th) 1 group from the input two-level data signal in such a way that the odd-th (or even-th) 1 group is at a high level, the even-th (or odd-th) 1 group is at a low level, and a signal '0' is at an intermediate level.

More preferably, the 1 group of the separated data signal may include signals having a phase difference of 180 degrees (π) therebetween.

In accordance with another illustrative embodiment of the present invention, a duobinary optical transmission apparatus is provided having an optical modulator. The optical modulator generates a modulated optical signal made by a modulation of an optical carrier wave. The optical modulator includes a T flip-flop, an AND gate, a delay, an adder, a modulator driving signal generator and a light source The T flip-flop receives a two-level data signal, and generates a toggled output signal at every rising edge of the two-level data signal. The AND gate receives the two-level data signal and an output signal of the T flip-flop, and performs an AND operation on the received signals. The delay receives the inverted signal of the two-level data signal, and delays the inverted two-level data signal by a predetermined time. The adder receives the output signal of the AND gate and an output signal of the delay, and generates a three-level signal by adding them. The modulator driving signal generator generates a modulator driving signal upon receiving the three-level signal. The light source generates an optical carrier wave. The interferometer-type optical modulator modulates the carrier wave into a two-level optical signal according to the modulator driving signal.

Preferably, the T flip-flop and the AND gate may separate an odd-th (or even-th) 1 group from the input two-level data signal in such a way that the odd-th (or even-th) 1 group is at a high level, the even-th (or odd-th) 1 group is at a low level, and a signal '0' is at an intermediate level.

More preferably, the 1 group of the separated data signal may include signals having a phase difference of 180 degrees (π) therebetween.

BRIEF DESCRIPTION OF THE DRAWINGS

The present invention will be more clearly understood from the following detailed description taken in conjunction with the accompanying drawings, in which:

FIG. 6a is a detailed circuit diagram of an adder shown in FIG. 5;

FIG. 6b is a logical truth table related to input signals of the adder shown in FIG. 6a;

DETAILED DESCRIPTION OF THE PREFERRED EMBODIMENTS

Figure 1:
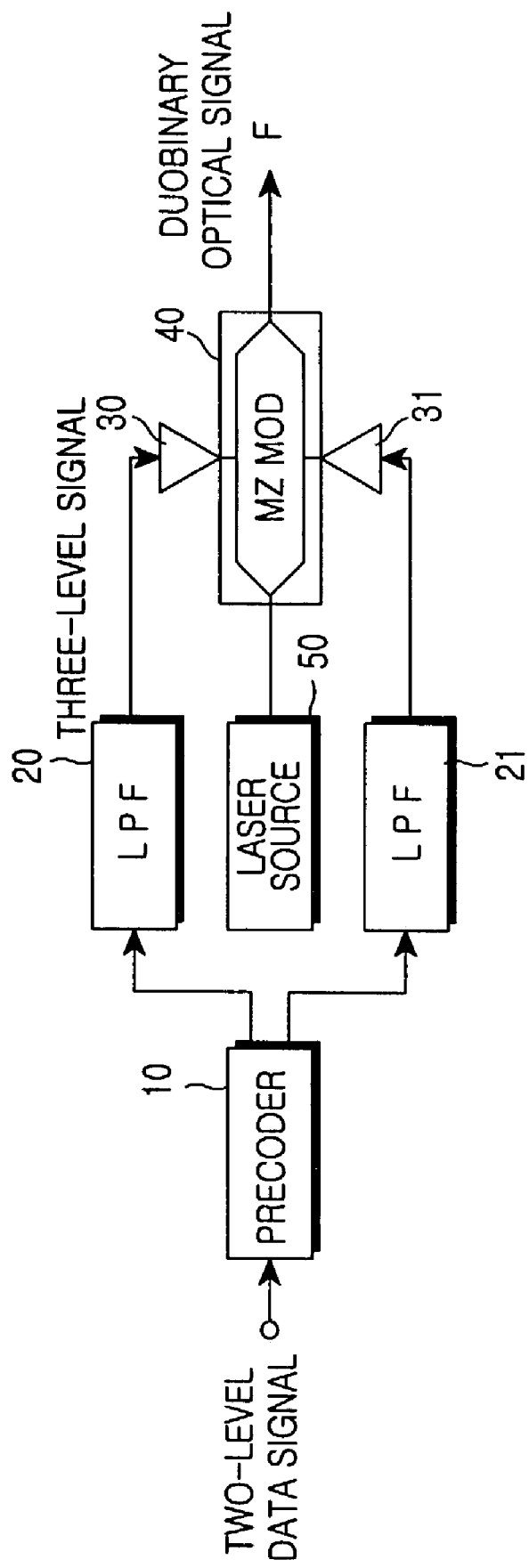
FIG. 1 is a block diagram of a conventional duobinary optical transmission system.
Figure 2:
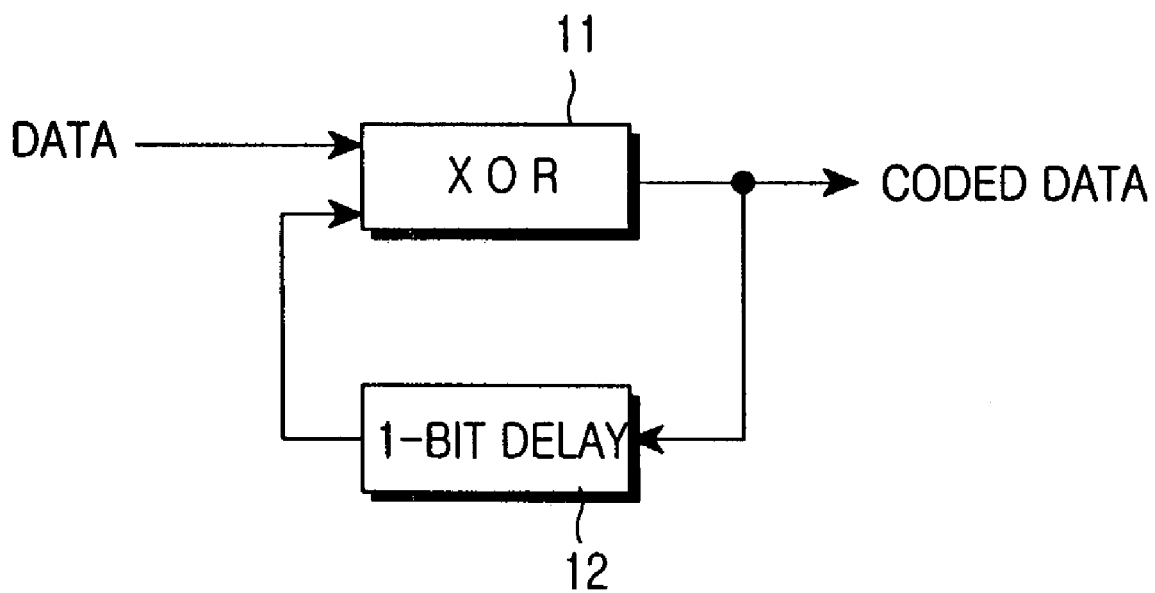
FIG. 2 is a block diagram of a precoder of the conventional duobinary optical transmission system shown in FIG. 1.

In the following description of the present invention, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. Moreover, it will be recognized that certain aspects of the figures are simplified for explanation purposes and that the full system environment for the invention will comprise many known functions and configurations all of which need not be shown here. In the drawings, the same or similar elements are denoted by the same reference numerals even though they are depicted in different drawings.

Figure 3:
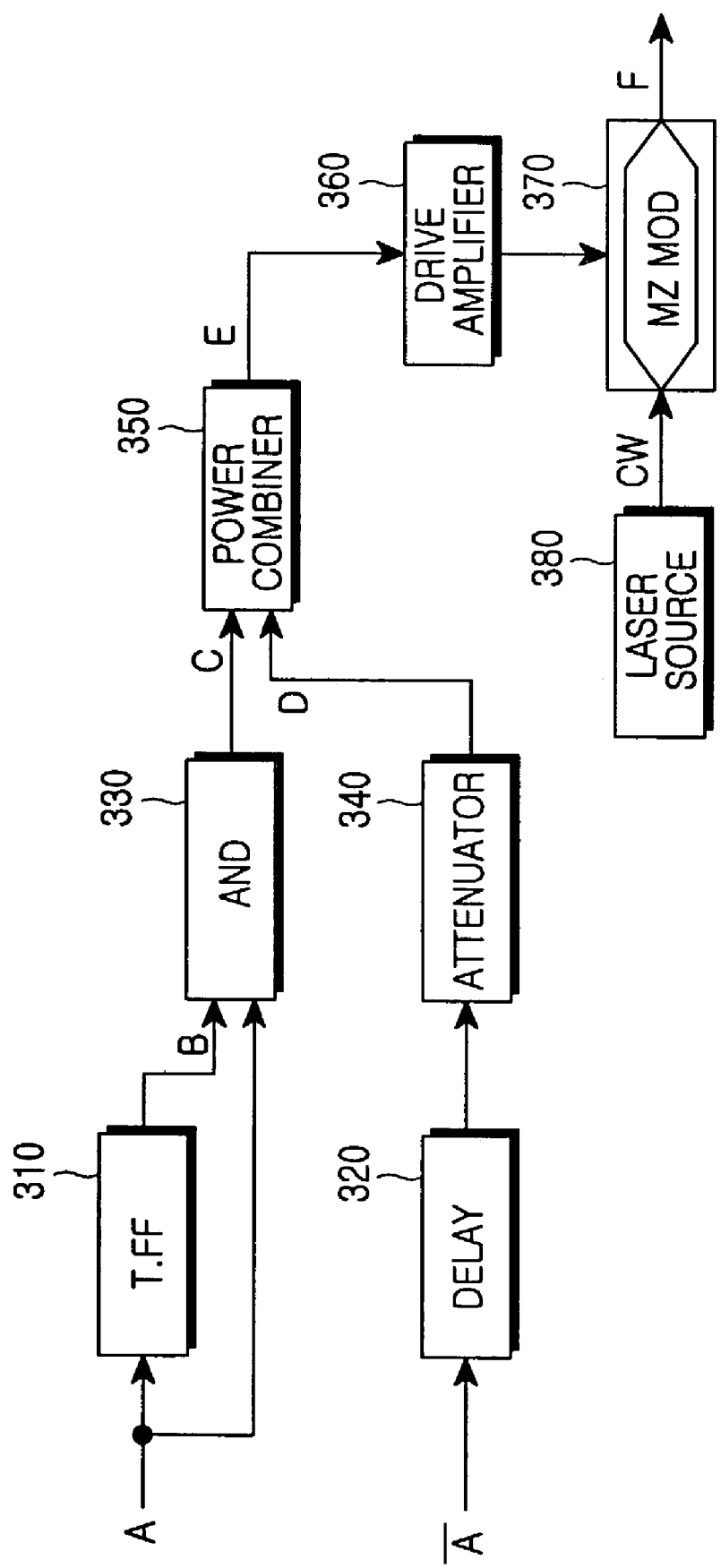
FIG. 3 is a block diagram of a duobinary optical transmission apparatus in accordance with a preferred embodiment of the present invention.

FIG. 3 is a block diagram of a duobinary optical transmission system in accordance with a preferred embodiment of the present invention. The duobinary optical transmission system includes a conventional: (1) driver 360, (2) Mach-Zehnder-interferometer-type optical intensity modulator (MZ MOD) 370, and (3) laser source 380 for generating a carrier wave. However, unlike conventional duobinary optical transmission systems, the duobinary optical transmission system according to the present invention does not use a precoder using a feedback loop and an electric LPF. Instead, the present invention uses a single Toggle Flip-Flop (T.FF) 310, a delay 320, an AND gate 330, an attenuator 340, and a power combiner 350.

Figure 4:
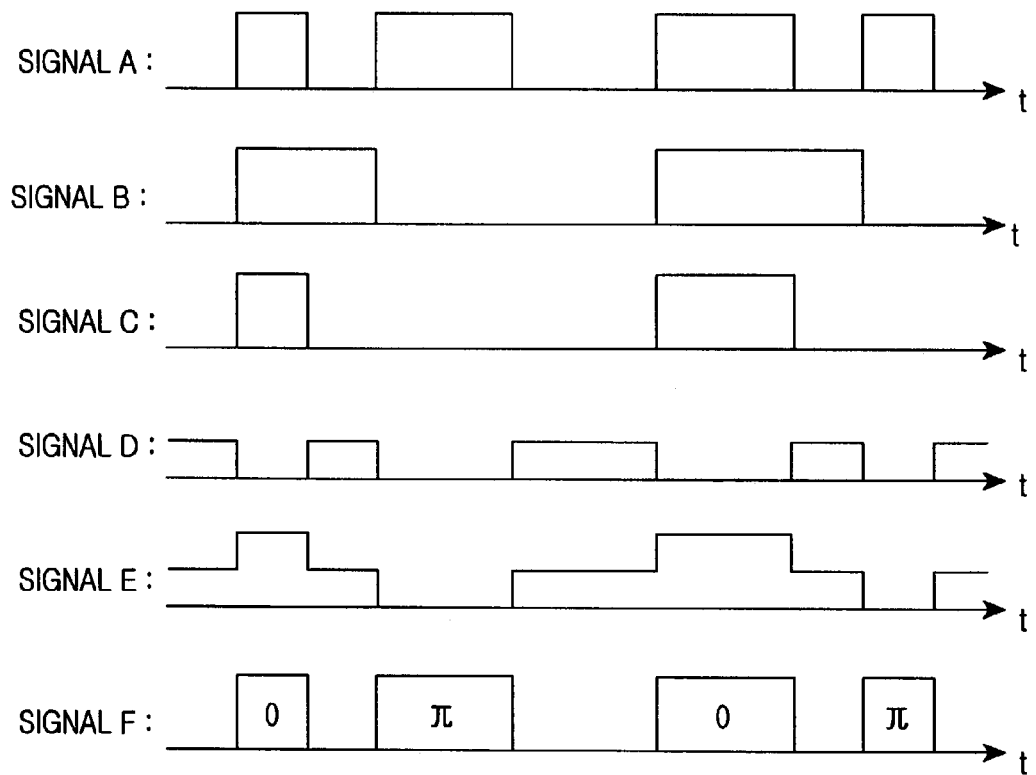
FIG. 4 is a view illustrating signal waveforms at nodes A~F shown in FIG. 3.

FIG. 4 is a timing diagram of output signals at nodes A~F shown in FIG. 3. Operations and signal flows of the duobinary optical transmission system will hereinafter be described with reference to FIGS. 3~4.

A two-level data signal A to be transmitted is applied to the T.FF 310. An inverted two-level data signal $\overline{A}$ (an inverted signal of the signal A) is applied to a delay 320. A toggled signal B is generated at every rising edge of the data signal A by the T.FF 310. The data signal A and the output signal B of the T.FF 310 are applied to the AND gate 330, and then the AND gate 330 generates a signal C. The T.FF 310 and the AND gate 330 are adapted to separate a group of '1' from the data signal. That is, the T.FF 310 and the AND gate 330 separate an odd-th (or even-th) 1 group from the data signal in such a way that the odd-th (or even-th) 1 group is at a high level, the even-th (or odd-th) 1 group is at a low level, and a signal '0' is at an intermediate level.

The inverted data signal $\overline{A}$ delayed for a given time through delay 320 and is applied to an attenuator 340. The attenuator generates a signal D for reducing intensity of the output signal of the delay 320 by half, and outputs the signal D to a power combiner 350. In this case, the delay 320 is adapted to enable the attenuator 340's output signal D and the AND gate 330's output signal C to be aligned in phase at the power combiner 350 in consideration of a self-delay value of the T.FF 310 and the influence of the AND gate 330.

Referring back to FIG. 3, the output signal C of the AND gate 330 and the output signal D of the attenuator 340 are added by the power combiner 350 in such a way that the initial two-level signal is converted into a three-level signal at the power combiner 350. The three-level signal is applied to a drive amplifier 360. Then the drive amplifier 360 outputs it to the MZ MOD 370 as a driving signal in such a way that a carrier wave received from the laser source 380 is modulated into a two-level optical signal at the MZ MOD 370. In this case, where the drive amplifier 360 generates a single output signal, this single output signal is adapted as a driving signal for a single arm MZ modulator with a single electrode. In the case, where the drive amplifier 360 generates a first output signal and a second output signal being an inverted signal of the first output signal, the first and second output signals are adapted as driving signals for a dual arm MZ modulator with a dual electrode.

Figure 5:
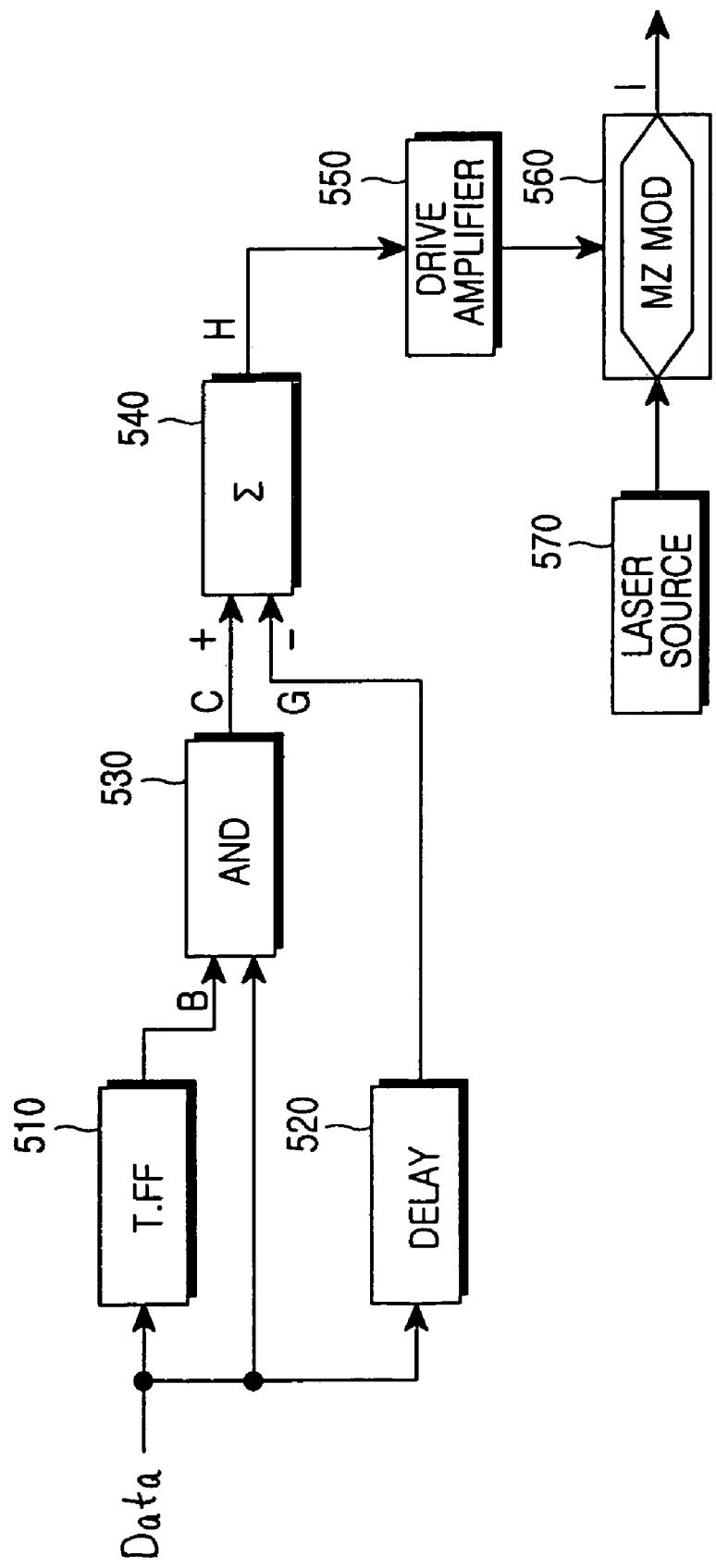
FIG. 5 is a block diagram of a duobinary optical transmission system in accordance with another preferred embodiment of the present invention.

FIG. 5 is a block diagram of a duobinary optical transmission system in accordance with another preferred embodiment of the present invention. The duobinary optical transmission system includes a convention (1) Toggle Flip-Flip (T.FF) 510, (2) delay 520, (3) AND gate 530, (4) drive amplifier 550, (5) Mach-Zehnder-interferometer-type optical intensity modulator (MZ MOD) 560, and (6) laser source 570. However, the duobinary optical transmission system in accordance to the present preferred embodiment of the present invention does not use an inverted data signal/Q and an attenuator for reducing intensity of the inverted data signal/Q. Instead, the present invention uses an adder 540 instead of a power combiner as shown in FIG. 3.

Figures 6A, 6B:
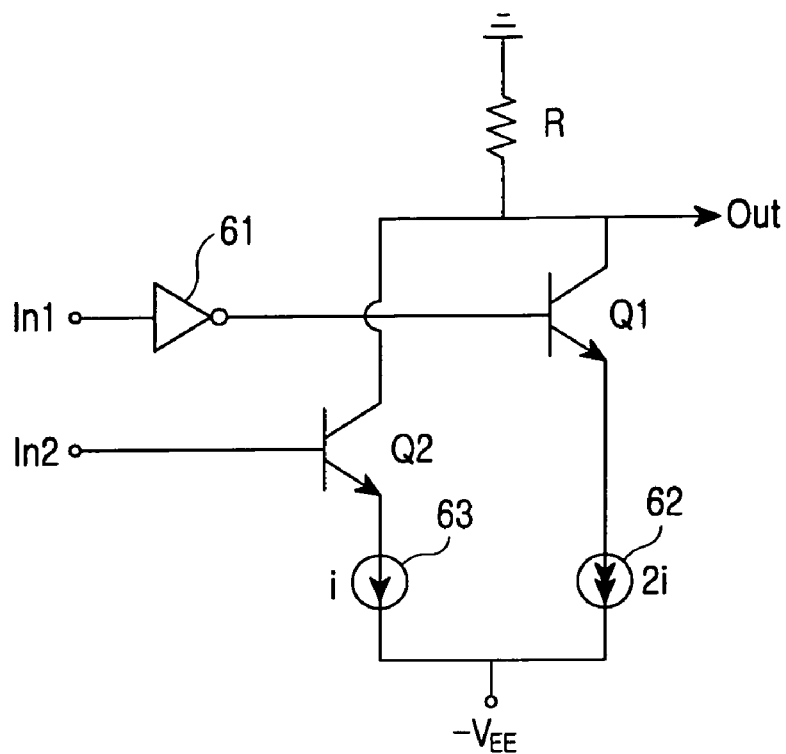

FIG. 6a is a detailed circuit diagram of the adder shown in FIG. 5. FIG. 6b is a logical truth table related to input signals of the adder shown in FIG. 6a.

Referring to FIG. 6a, a first input signal in1 denotes a reference character '+' shown in FIG. 5, and a second input signal in2 denotes a reference character '−' shown in FIG. 5. The first input signal in1 is logically inverted by an inverter, and is input to the base of the first transistor Q1. The second input signal in2 is input to the base of the second transistor Q2. The first and second transistors Q1 and Q2 connect their own emitter to current sources 62 and 63, respectively. A current magnitude of the current source 62 connected to the emitter of the first transistor Q1 is double that of the other current source 63 connected to the emitter of the second transistor Q2. A collector of each transistor is connected to the load resistor R. One of current values 0, i, and 2i may be applied to the load resistor R according to an ON or OFF state of each transistor. In conclusion, output voltages of the adder become signals '0', 'iR', and '2iR'.

Referring to FIG. 6a, when an input signal '1' is applied to each transistor, each transistor is turned off such that current is not applied thereto. When an input signal '0' is applied to each transistor, each transistor is turned on such that a current from each current source is applied thereto. In the case where the first and second input signals are respectively at a logical level '1', they are inverted to a logic level '0' by an inverter, and the logic level '0' is applied to the first transistor Q1 and the logic level '1' is applied to the second transistor Q2. Therefore, the first transistor Q1 is only turned on such that a current of 2i is applied to the load resistor R and an output voltage of the adder becomes a signal of 2iR. In the case where the first and second input signals are respectively at a logical level '0', the second transistor Q2 is only turned on such that a current of i is applied to the load resistor R and an output voltage of the adder becomes a signal of iR.

FIG. 6b is a logical truth table related to input signals in1 and in2 of the adder shown in FIG. 6a. In the case where an output signal of the adder 540 is an AC-coupled signal, a signal 2iR may be represented as a logic level '+1', a signal of iR may be represented as a logic level '0', and a signal of 0 may be represented as a logic level '−1'. There is no case where the first input signal in1 is at a logic level '1' and the second input signal in2 is at a logic level '0' in the adder 540 shown in FIG. 5.

Figure 7:
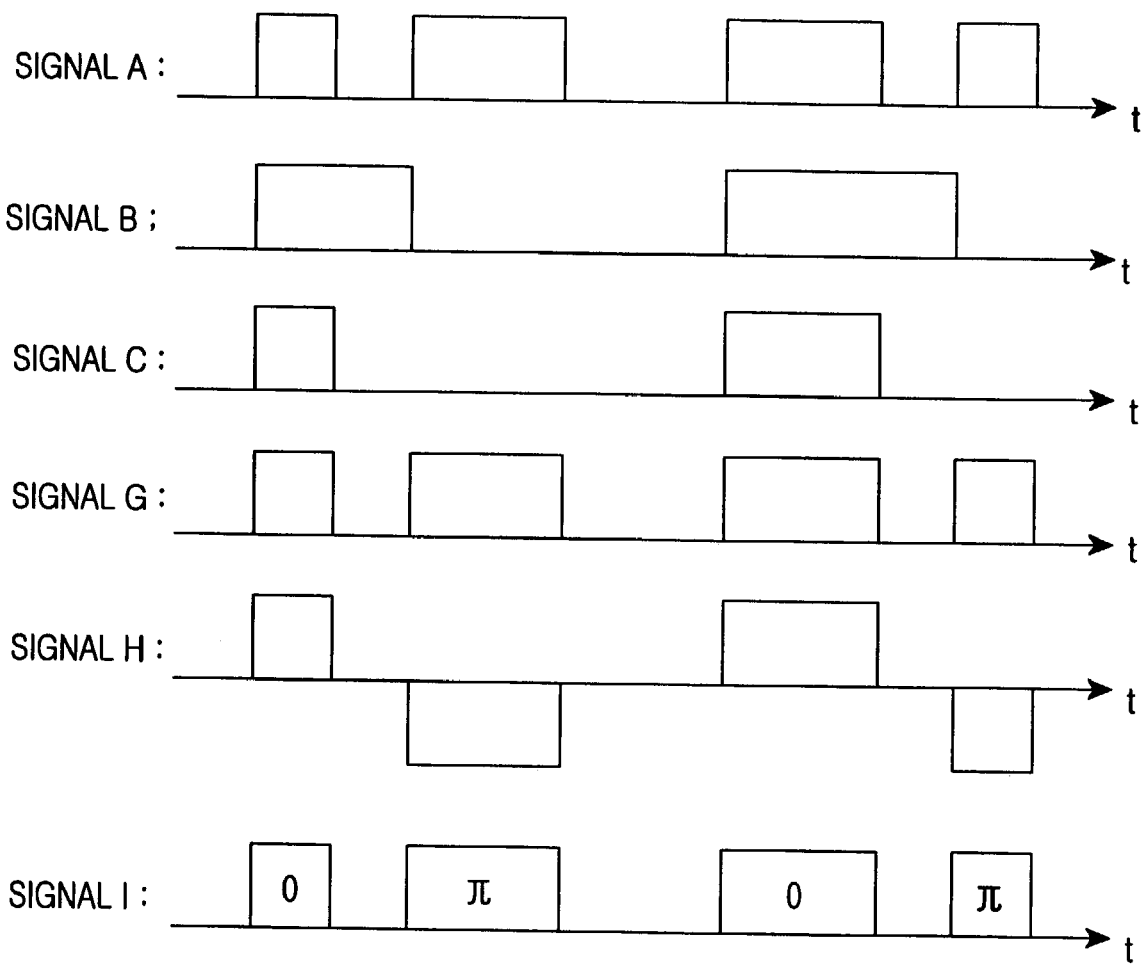
FIG. 7 is a view illustrating signal waveforms at nodes A~C and G~I shown in FIG. 5.

FIG. 7 is a view illustrating signal waveforms at nodes A~C and G~I shown in FIG. 5. Operations and signal flows of the duobinary optical transmission system will hereinafter be described with reference to FIGS. 5 and 7.

The operations at nodes A~C are similar to those of FIG. 3 such that signal waveforms A~C shown in FIG. 7 are similar as those of FIG. 5. An output signal C of an AND gate 530 and an output signal G of a delay 520 are applied to an adder 540 such that the adder 540 generates a three-level signal H. The three-level signal H is amplified by a drive amplifier 550, and the amplified three-level signal H is applied to the MZ MOD 560 as a driving signal. In this case, in the same manner as FIG. 3, where the drive amplifier 550 generates a single output signal, this single output signal is adapted as a driving signal for a single arm MZ modulator with a single electrode. In the case where the drive amplifier 550 generates a first output signal and a second output signal being an inverted signal of the first output signal, the first and second output signals are adapted as driving signals for a dual arm MZ modulator with a dual electrode.

Figure 8:
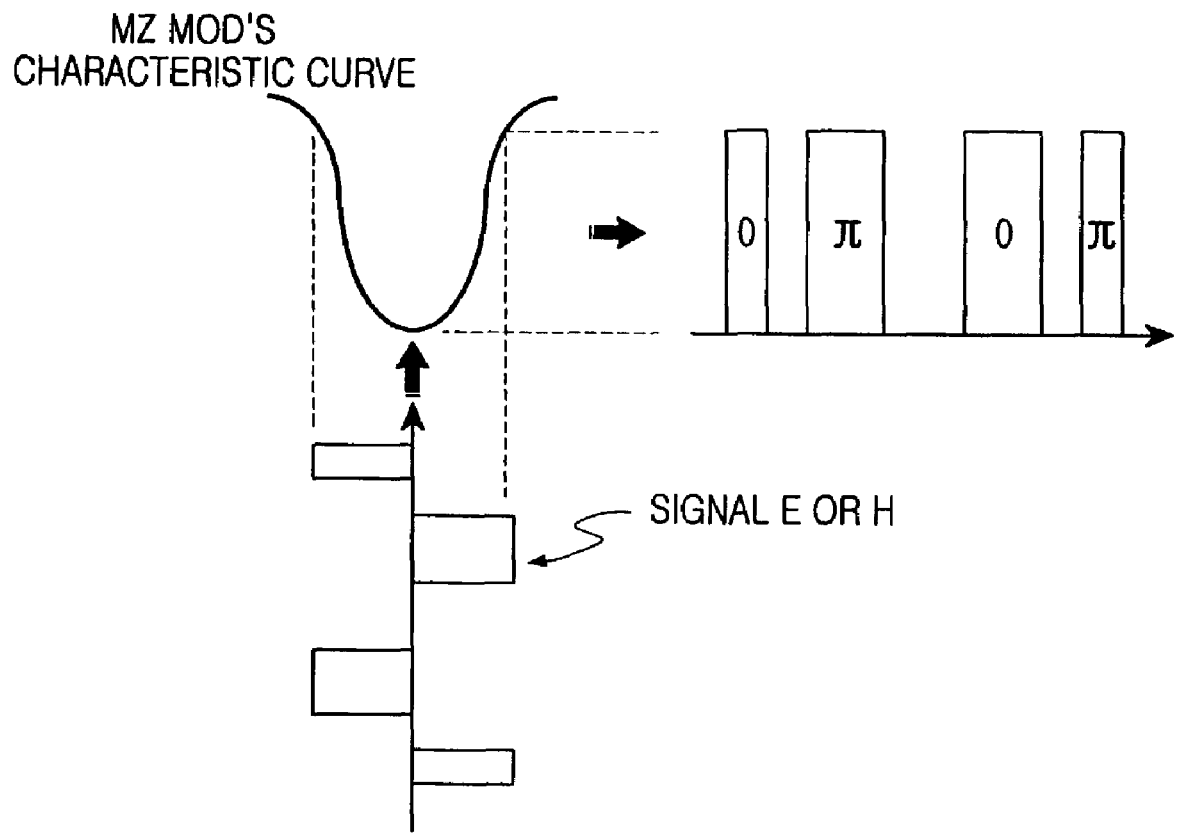
FIG. 8 is a view illustrating a duobinary optical signal modulation procedure at a Mach-Zehnder-interferometer-type optical intensity modulator (MZ MOD).

FIG. 8 is a view illustrating a duobinary optical signal modulation procedure at a Mach-Zehnder-interferometer-type optical intensity modulator (MZ MOD). A three-level signal E (shown in FIG. 3) or a three-level signal H (again as shown in FIG. 3) are respectively applied to a MZ MOD such that the MZ MOD generates a duobinary optical signal F having a phase difference of 180 degrees ($\pi$). In this case, a bias of the MZ MOD is positioned at a null point of a MZ MOD's characteristic curve.

As apparent from the above description, a duobinary optical transmission system according to the present invention uses the crossed phase characteristics of a duobinary signal without using a feedback-type precoder and an electric LPF, and is thereby not affected by PRBS. Also, the duobinary optical transmission system is very resistant to wavelength division characteristics, thereby increasing a transmission distance as well as improving a transfer rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A duobinary optical transmission apparatus having an optical modulator for generating a modulated optical signal made by a modulation of an optical carrier wave, said optical modulator comprising:
   a T flip-flop configured to receive a two-level data signal and generate a toggled output signal at every rising edge of the two-level data signal;
   an AND gate configured to perform an AND operation on the two-level data signal and the toggled output signal;
   a delay configured to delay an inverted signal of the two-level data signal by a predetermined time;
   an attenuator being directly coupled to the output of the delay and being configured to reduce intensity of the delayed output signal;
   a power combiner being directly coupled to the output of the AND gate and output of the attenuator and being configured to generate a three-level signal by adding an output signal of the AND gate and an output signal of the attenuator;
   a modulator driving signal generator for generating a modulator driving signal upon receiving the three-level signal;
   a light source for generating optical carrier wave; and
   an interferometer-type optical modulator for modulating the carrier wave into a two-level optical signal according to the modulator driving signal.

2. The duobinary optical transmission apparatus as set forth in claim 1, wherein the attenuator is configured to reduce the intensity of the delayed output signal by substantially half.

3. The duobinary optical transmission apparatus as set forth in claim 2, wherein the T flip-flop and the AND gate is configured to separate a first 1 group from the input two-level data signal wherein the first 1 group is at a high level, a second 1 group is at a low level, and a signal '0' is at an intermediate level.

4. The duobinary optical transmission apparatus as set forth in claim 3, wherein the data signals in the first and second 1 group have a phase difference of 180 degrees ($\pi$) therebetween.

5. The duobinary optical transmission apparatus as set forth in claim 1, wherein the optical modulator is a Mach-Zehnder-interferometer-type optical intensity modulator (MZ MOD) having one or two electrodes.

6. A duobinary optical transmission apparatus having an optical modulator for generating a modulated optical signal made by a modulation of an optical carrier wave, said optical modulator comprising:
 a T flip-flop configured to generate a toggled output signal at every rising edge of a two-level data signal;
 an AND gate configured to perform AND operation on the two-level data signal and the toggled output signal;
 a delay configured to delay a non-inverted signal of the two-level data signal by a predetermined time;
 an adder being directly coupled to the output of the AND gate and the delay and being configured to generate a three-level signal by adding an output signal of the AND gate and an output signal of the delay,
 a modulator driving signal generator configured to generate a modulator driving signal upon receiving the three-level sigal;
 a light source configured to generate an optical carrier wave; and
 an interferometer-type optical modulator configured to modulate the carrier wave into a two-level optical signal according to the modulator driving signal.

7. The duobinary optical transmission apparatus as set forth in claim 6, wherein the T flip-flop and the AND gate is configured to separate a first 1 group from the input two-level data signal wherein the first 1 group is at a high level, a second 1 group is at a low level, and a signal '0' is at an intermediate level.

8. The duobinary optical transmission apparatus as set forth in claim 7, wherein the data signals in the first and second 1 group have a phase difference of 180 degrees ($\pi$) therebetween.

9. The duobinary optical transmission apparatus as set forth in claim 6, wherein the adder includes:
 an inverter configured to invert an output signal of the AND gate;
 a first transistor configured to connect its own base to an output terminal of the inverter and to form a collector-emitter current path between a load resistor and a first current source; and
 a second transistor configured to connect its own base to an output terminal of the delay and to form a collector-emitter current path between the load resistor and a second current source, wherein, a current magnitude of the first current source is double that of the second current source.

10. The duobinary optical transmission apparatus as set forth in claim 6, wherein the optical modulator is a Mach-Zehnder-interferometer-type optical intensity modulator (MZ MOD) having one or two electrodes.

11. A duobinary optical transmission apparatus comprising:
 an optical modulator configured to receive a two-level data signal, the optical modulator including,
 a toggle device configured to generate a toggled signal at every rising edge of the two-level data signal;
 a logic AND device configured to generate an ANDed signal of the two-level data signal and toggled output signal;
 an attenuator being directly coupled to a delay device and being configured to reduce intensity of an inverted delayed signal of the two level data signal; and
 a combiner configured to combine the output of the ANDed signal and a delayed inverted signal to generate a three level signal, wherein the attenuator is directly coupled to the combiner,
 a modulator driving signal generator configured to generate a modulator driving signal using the three-level signal;
 a light source configured to generate an optical carrier wave; and
 an interferometer-type optical modulator configured to modulate the carrier wave into a two-level optical signal according to the modulator driving signal.

12. The duobinary optical transmission apparatus as set forth in claim 11, further including:
 a means for modifying the ratio of intensity of the inverted/delayed signal and the ANDed signal.

13. The duobinary optical transmission apparatus as set forth in claim 11, wherein the T flip-flop and the AND gate is configured to separate a first 1 group from the input two-level data signal wherein the first 1 group is at a high level, a second 1 group is at a low level, and a signal '0' is at an intermediate level.

14. The duobinary optical transmission apparatus as set forth in claim 13, wherein the data signals in the first and second 1 groups have a phase difference of 180 degrees ($\pi$) therebetween.

* * * * *